(12) United States Patent
Balogh et al.

(10) Patent No.: US 10,091,159 B2
(45) Date of Patent: Oct. 2, 2018

(54) ASSIGNING NETWORK ADDRESSES TO POSSIBLE NETWORK PORTS TO FULLEST EXTENT TO WHICH ADDRESSES CAN BE ASSIGNED TO PORTS

(71) Applicant: Lenovo Enterprise Solutions (Singapore) PTE. LTD., New Tech Park (SG)

(72) Inventors: Nicholas J. Balogh, Raleigh, NC (US); Nicholas J. Cook, Raleigh, NC (US); David B. Roberts, Newcastle, ME (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 313 days.

(21) Appl. No.: 14/874,959

(22) Filed: Oct. 5, 2015

(65) Prior Publication Data

US 2017/0099257 A1 Apr. 6, 2017

(51) Int. Cl.
*G06F 15/177* (2006.01)
*H04L 29/12* (2006.01)
*H04L 29/08* (2006.01)
*H04L 29/06* (2006.01)

(52) U.S. Cl.
CPC .......... *H04L 61/20* (2013.01); *H04L 67/1097* (2013.01); *H04L 69/16* (2013.01)

(58) Field of Classification Search
CPC ......... G06F 12/0653; G06F 2213/0052; H04L 29/12009; H04L 29/12924; H04L 61/20; H04L 61/2007; H04L 61/2015; H04L 61/6004; H04L 61/6063; H04L 67/1097; H04L 69/16; H04L 69/161
See application file for complete search history.

(56) References Cited

U.S. PATENT DOCUMENTS

| | | | | |
|---|---|---|---|---|
| 2003/0018804 A1* | 1/2003 | Laxman | ............ | H04L 29/12009 709/236 |
| 2003/0051014 A1* | 3/2003 | Gluska | .............. | H04L 29/12009 709/222 |
| 2004/0024573 A1* | 2/2004 | Allen | ...................... | H04L 41/12 702/189 |
| 2006/0059325 A1* | 3/2006 | Milne | ................. | G06F 13/4081 711/200 |
| 2006/0268854 A1* | 11/2006 | Lee | ...................... | G05B 19/054 370/389 |

(Continued)

*Primary Examiner* — Christopher Biagini
(74) *Attorney, Agent, or Firm* — Jason Friday

(57) ABSTRACT

The possible network ports of a computing device are determined, regardless of whether they are currently usable. A network address is assigned to each possible network port. The network ports can include physical network ports and virtual network ports. Physical network ports can include physical network ports that are physically present, currently activated, and currently usable within the computing device; physical network ports that are physically present, not currently activated, and not currently usable within the computing device; and physical network ports that are not physically present and not currently usable within the computing device. Virtual network ports can include virtual network ports that have been instantiated and that are currently usable; and virtual network ports that have not been instantiated and that are not currently usable.

18 Claims, 3 Drawing Sheets

(56) References Cited

U.S. PATENT DOCUMENTS

| | | | |
|---|---|---|---|
| 2007/0217413 A1* | 9/2007 | Margalit | H04L 29/12216 370/389 |
| 2008/0028045 A1* | 1/2008 | Bealkowski | H04L 41/0803 709/219 |
| 2008/0140888 A1* | 6/2008 | Blair | G05B 19/054 710/104 |
| 2014/0114953 A1* | 4/2014 | McClung | G06F 17/30994 707/722 |
| 2014/0136678 A1* | 5/2014 | Nguyen | H04L 29/12839 709/223 |

* cited by examiner

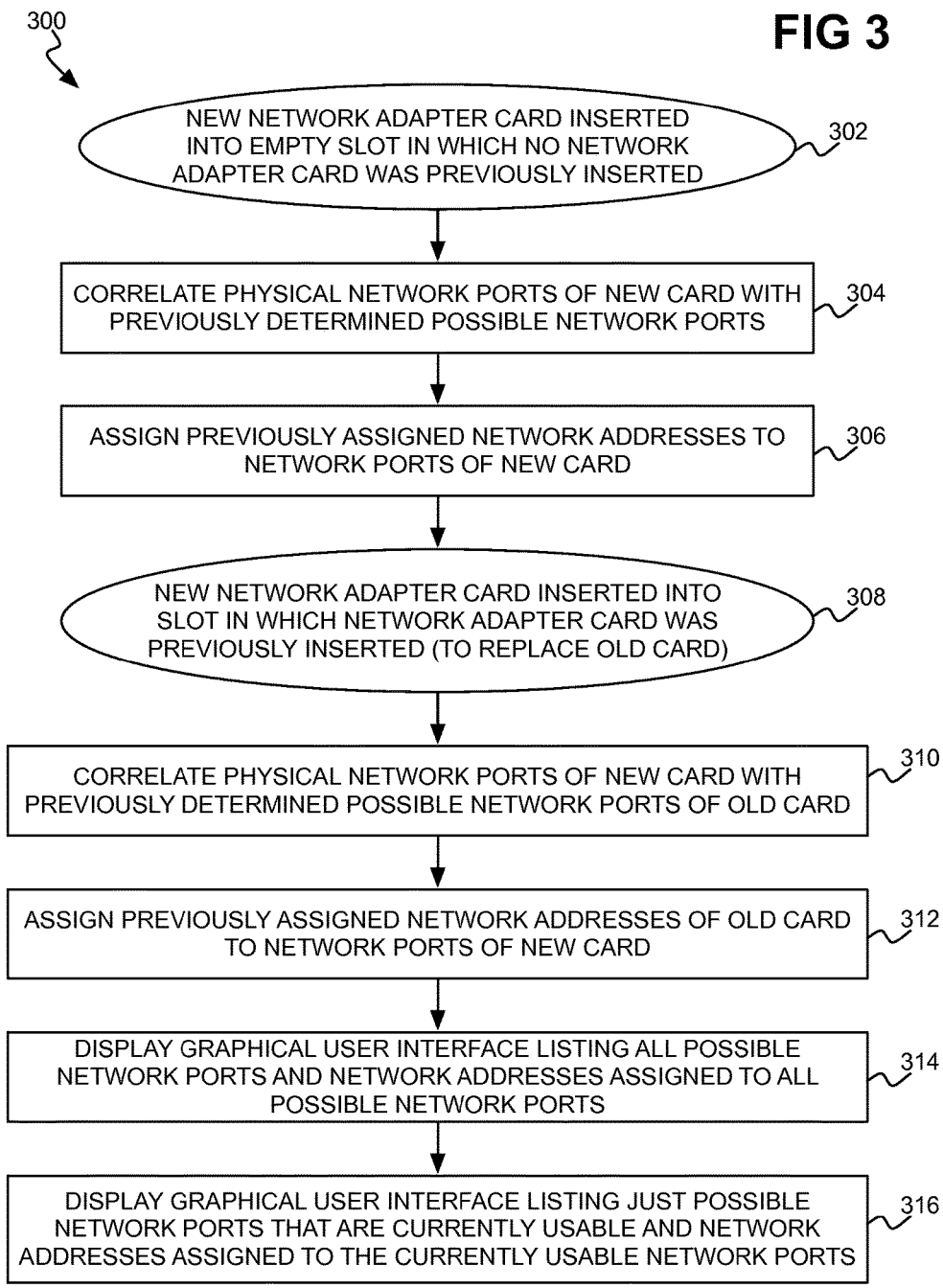

| ADDRESS | ADDRESS TYPE | LOCATION |
|---|---|---|
| | ALL (402) | CURRENTLY USABLE (404) |
| (ADDRESS) | WWPN | ADAPTER 1, PORT 1 |
| (ADDRESS) | WWNN | ADAPTER 1, PORT 1 |
| (ADDRESS) | MAC | ADAPTER 1, PORT 1 |
| (ADDRESS) | MAC | ADAPTER 1, PORT 1, FUNCTION 1 |
| (ADDRESS) | MAC | ADAPTER 1, PORT 1, FUNCTION 2 |
| (ADDRESS) | MAC | ADAPTER 1, PORT 1, FUNCTION 3 |
| (ADDRESS) | MAC | ADAPTER 1, PORT 1, FUNCTION 4 |
| (ADDRESS) | WWPN | ADAPTER 1, PORT 2 |
| (ADDRESS) | WWNN | ADAPTER 1, PORT 2 |
| (ADDRESS) | MAC | ADAPTER 1, PORT 2 |
| (ADDRESS) | MAC | ADAPTER 1, PORT 2, FUNCTION 1 |
| (ADDRESS) | MAC | ADAPTER 1, PORT 2, FUNCTION 2 |
| (ADDRESS) | MAC | ADAPTER 1, PORT 2, FUNCTION 3 |
| (ADDRESS) | MAC | ADAPTER 1, PORT 2, FUNCTION 4 |

| ADDRESS | ADDRESS TYPE | LOCATION |
|---|---|---|
| | ALL (402) | CURRENTLY USABLE (404) |
| (ADDRESS) | WWPN | ADAPTER 1, PORT 1 |
| (ADDRESS) | WWNN | ADAPTER 1, PORT 1 |
| (ADDRESS) | MAC | ADAPTER 1, PORT 1 |
| (ADDRESS) | MAC | ADAPTER 1, PORT 1, FUNCTION 1 |
| (ADDRESS) | MAC | ADAPTER 1, PORT 1, FUNCTION 2 |
| (ADDRESS) | MAC | ADAPTER 1, PORT 1, FUNCTION 3 |
| (ADDRESS) | MAC | ADAPTER 1, PORT 1, FUNCTION 4 |

ASSIGNING NETWORK ADDRESSES TO POSSIBLE NETWORK PORTS TO FULLEST EXTENT TO WHICH ADDRESSES CAN BE ASSIGNED TO PORTS

BACKGROUND

Computing devices are commonly interconnected with other computing devices as well as with peripheral devices over networks. Examples of networks include Transmission Control Protocol/Internet Protocol (TCP/IP) networks such as Ethernet networks, as well as storage-area networks (SANs). To connect to a network, a computing device may have one or more physical network ports. To provide for additional capability and ease of management, each physical network port may further be able to be virtualized into one or more virtual network ports.

SUMMARY

An example method includes determining, by a processor, possible network ports of a computing device, regardless of whether the possible network ports are currently usable. The method includes assigning network addresses, by the processor, to each possible network port to a fullest extent to which the possible network port can have the network addresses assigned. The method includes permitting, by the processor, management actions to be performed in relation to the possible network ports regardless of whether the possible network ports are currently usable.

An example non-transitory computer-readable data storage medium stores computer-executable code that a processor executes to perform the following. Possible network ports of a computing device are determined, regardless of whether the possible network ports are currently usable. Network addresses are assigned to each possible network port. The possible network ports includes first physical network ports that are physically present, currently activated, and currently usable within the computing device; second physical network ports that are physically present, not currently activated, and not currently usable within the computing device; and third physical network ports that are not physically present and not currently usable within the computing device. The possible network ports include first virtual network ports that have been instantiated and that are currently usable, each first virtual network port corresponding to one of the first physical network ports; and second virtual network ports that have not been instantiated and that are not currently usable, each second virtual network port corresponding to one of the second or third physical network ports.

An example computing device includes a processor and a non-transitory computer-readable data storage medium storing computer-executable code executable by the processor to perform the following. Possible network ports of the computing device are determined, regardless of whether the possible network ports are currently usable. Network addresses are assigned to each possible network port. The possible network ports includes first physical network ports that are physically present, currently activated, and currently usable within the computing device; second physical network ports that are physically present, not currently activated, and not currently usable within the computing device; and third physical network ports that are not physically present and not currently usable within the computing device. The possible network ports include first virtual network ports that have been instantiated and that are currently usable, each first virtual network port corresponding to one of the first physical network ports; and second virtual network ports that have not been instantiated and that are not currently usable, each second virtual network port corresponding to one of the second or third physical network ports.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of an example method that can be performed subsequent to the method of FIG. 1 being performed.

FIGS. 4 and 5 are diagrams of example graphical user interfaces that can be displayed via performance of the method of FIG. 3.

DETAILED DESCRIPTION

Figure 1:
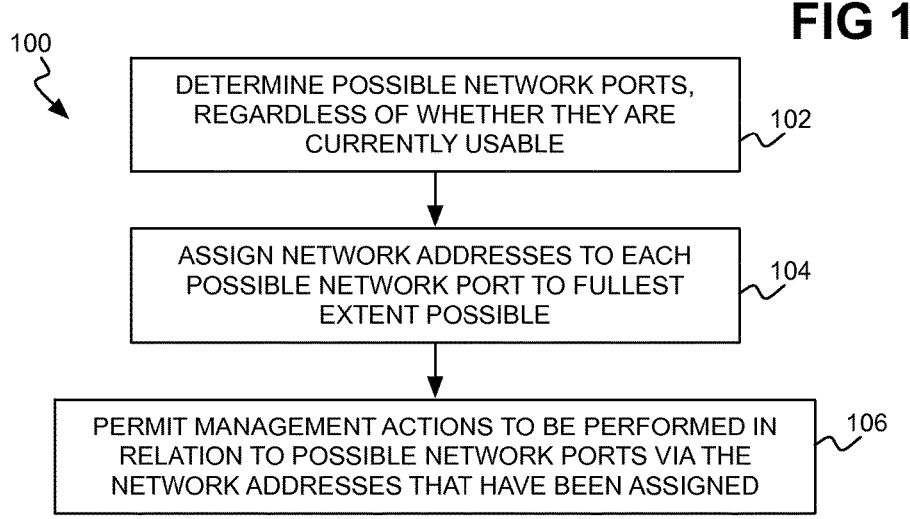
FIG. 1 is a flowchart of an example method.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, computing devices can connect to networks via network ports. A cable is inserted into a network port of the computing device at one end, and the other end of the cable is usually inserted into a network port of a networking device, such as a switch or a router. For bandwidth and redundancy concerns, among other considerations, a computing device may have more than one physical network port. Furthermore, as noted in the background section, each physical network port can itself be virtualized as one or more virtual network ports.

In some types of networks, such as storage-area networks (SANs), different network ports of a computing device can be zoned to the same or different networking zones, which are separately accessible. In a SAN, each zone includes a different set of storage devices to which the computing device can communicate via the network port in that zone. In TCP/IP networks, a similar situation occurs with subnets, where a computing device may be able to access different devices within different subnets via the network ports configured for those subnets.

Conventionally, performing management actions like zoning in relation to the network ports of a computing device presumes that, in the case of physical network ports, the network ports are present within the computing device and have been enabled or activated. In the case of virtual network ports, management actions presume that the network ports have been instantiated. Therefore, such management actions cannot accommodate network ports that may be added or activated at a later time in the case of physical network ports, or that may be instantiated or virtualized at a later time in the case of virtual network ports.

For example, a computing device may have two slots that are each receptive to insertion of a network adapter card having two physical network ports. One slot may be currently occupied, whereas the other slot may be currently empty. Therefore, management actions like zoning cannot be performed regarding the network ports of the empty slot. That is, although the slot may be later populated with a network adapter card, because a network adapter card is not currently inserted into the slot, the physical network ports do not yet exist, and thus cannot have management actions performed in relation to them.

Furthermore, as to the slot that is currently populated with a network adapter card, just one of the two physical network ports may be currently enabled or activated. Therefore, management actions cannot be performed as to the currently disabled or unactivated network port. As an additional example, the physical network port that is present and currently enabled may be able to be virtualized over five virtual network ports, but currently has just been virtualized over two virtual network ports. This means that management actions cannot be performed as to the three virtual network ports that have not yet been instantiated for the physical network port in question.

Techniques disclosed herein overcome these shortcomings. In particular, all the possible network ports of a computing device are determined, regardless of whether they are currently usable. Furthermore, a network address (that is, at least one network address) is assigned to each possible network port to a fullest extent to which the port can have addresses assigned. The network ports can include both physical and virtual network ports. The physical network ports can include those that are physically present, currently activated, and currently usable within the computing device; those that are physically present but not currently activated and thus not currently usable; and those that are not physically present and thus not currently usable within the computing device. Virtual network ports can include virtual such ports that have been instantiated and that are currently usable, as well as those that have not yet been instantiated and therefore that are not currently usable.

FIG. 1 shows an example method 100. All possible network ports of a computing device are determined, regardless of whether they are currently usable or not (102). As has been noted, network ports can include both physical network ports and virtual network ports. Physical network ports can include those that are physically present, currently activated, and currently usable; those that are physically present, not currently activated, and thus not currently usable; and those that are not physically present and therefore not currently usable.

A physical network port may be physically present but not currently activated or enabled in one or more of a number of different ways. For example, the physical network port may have been disabled at the operating system level. The port thus exists, but is not activated and therefore not usable. As another example, the physical network port may not be licensed for usage, and therefore is disabled at a lower level than at the operating system level. Such a port again still exists, but is not activated and therefore not usable.

Virtual network ports can include those that have been instantiated and are currently usable. Such virtual network ports correspond to and are associated with physical network ports that are physically present, currently activated, and currently usable. Virtual network ports can also include those that have not been instantiated and that are not currently usable. Such virtual network ports can correspond to any of the three types of physical network ports described in the previous paragraph.

In one implementation, determining all possible network ports of a computing device can be performed by interrogating the operating system running on the computing device. The operating system has knowledge of at least the physical network ports that are physically present, regardless of whether they are currently activated or not and thus regardless of whether they are currently usable or not. The operating system further has knowledge of the virtual network ports that have been instantiated and that are currently usable.

To determine the physical network ports that are not physically present, in one implementation, the operating system is first interrogated to determine the number of physical slots present in the computing device that are empty and thus not currently populated with network adapter cards. For each such slot, a number of physical network ports can then be determined. For example, this number may be predetermined or preassigned, or may be specified by a user. It may be known, for instance, that existing network adapter cards have at most a certain number of physical network ports, or the user may be requested to provide the likely number of physical network ports that will be present on a network adapter card if later inserted into the empty slot.

To determine the virtual network ports that have not yet been instantiated and therefore are not currently usable, each physical network port that has been determined is examined to determine its type. Based on the type of the physical network port, the maximum number of virtual network ports that can be assigned can be determined. For example, some types of physical SAN network ports can accommodate up to five virtual functions, or virtual network ports. Therefore, for each physical SAN network port that has been determined, if less than five virtual network ports have not yet been instantiated, then additional virtual network ports are determined to bring the total to the maximum possible.

Therefore, determining all the possible network ports in part 102 can include determining network ports associated with network adapter cards that have been inserted into slots of the computing device or that are associated with network adapters that are built into the computing device. The latter network adapters are built into the computing device in that, for instance, they are not part of cards that are removable from the computing device, and may instead be built into the main or other logic boards of the device. Determining all the possible network parts in part 102 further can include determining network ports for empty slots of the computing device, under the assumption that network adapter cards may be later inserted into the empty slots.

Network addresses are assigned to each network port to the fullest extent possible (104). The number of network addresses assigned to each network port depends on whether the network port is physical or virtual, and can also depend on the type of network port. For example, a physical SAN network port can have three network addresses: a media access controller (MAC) address, a worldwide port name (WWPN) address, and a worldwide node name (WWNN) address. A virtual SAN network port, by comparison, may have just one network address. As another example, a physical Ethernet network port can have three network addresses: a MAC address, an Internet Protocol version four (IPv4) address, and an Internet Protocol version six (IPv6) address.

For each physical network port that is physically present, regardless of whether it is currently activated or not and thus regardless of whether it is currently usable or not, one or more existing physical network addresses that were previously assigned thereto may be retrieved, such as by interrogating the operating system running on the computing device. For instance, typically at least the MAC address is pre-assigned to a physical network port. For each physical network port that is not physically present and thus not currently able, a new physical network address may be assigned thereto.

For each virtual network port that has been instantiated and thus is currently usable, one or more existing virtual network addresses that were previously assigned thereto may be retrieved, such as by interrogating the operating system running on the computing device. For instance, when a virtual network port is instantiated, typically it is assigned a virtual network address at the same time. For each virtual network port that has not yet been instantiated and thus that is not currently usable, a new virtual network address may be assigned thereto.

Once all the possible network ports of the computing device have been determined, and network addresses assigned thereto to the fullest extent possible, management actions are permitted to be performed in relation to the network ports (106). In general, such management actions are typically performed at the network address level. Because network addresses have been assigned to network ports regardless of whether the ports are usable or not, management actions can be undertaken for later activated or instantiated such network ports.

As one example, a computing device may have two physical network ports for a SAN. Just one may be currently enabled or activated, and this network port may be assigned to a particular SAN zone, based on the addresses thereof. However, it may be planned that at some point in the future, the other network port will be activated (and indeed, it may not be physically present yet), for assignment to a different SAN zone, again based on the addresses of this port. The techniques disclosed herein permit this assignment to be made at the present time, even though the network port does not actually exist yet. Permitting management actions to be performed in relation to both currently usable and not currently usable network ports can ease network administration.

Figure 2:
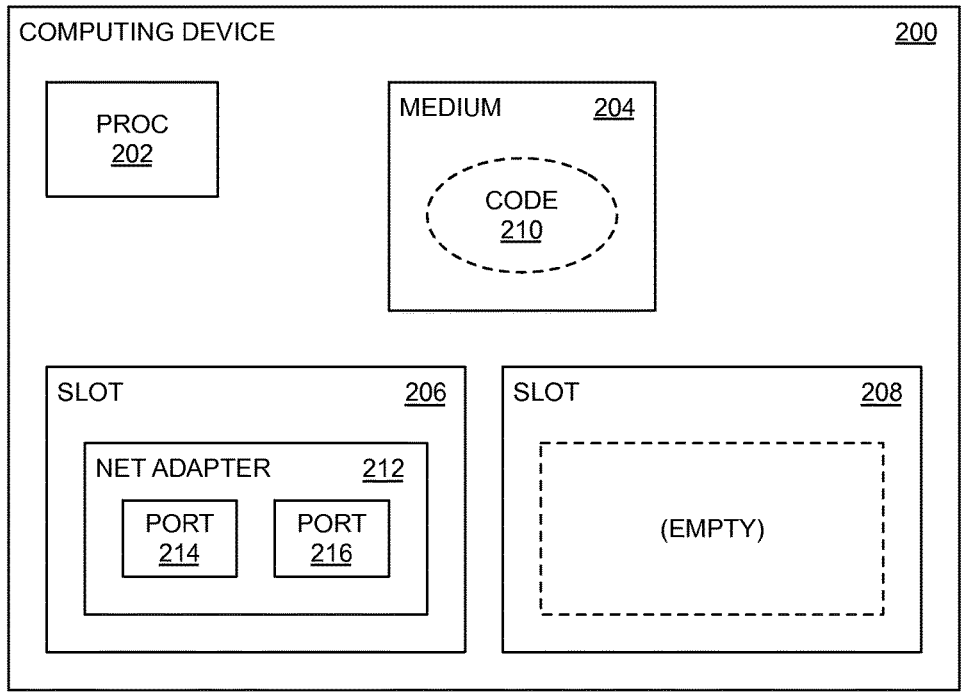
FIG. 2 is a diagram of an example computing device that can perform the method of FIG. 1 and in relation to which the method of FIG. 1 can be performed.

FIG. 2 shows an example computing device 200. In the example of FIG. 2, the computing device 200 includes at least a processor 202, a computer-readable medium 204, and two slots 206 and 208. The computer-readable medium 204 may be a volatile or a non-volatile medium, and stores computer-executable code 210 that the processor 210 executes to perform the method 100. A network adapter card 212 is inserted into the slot 206, whereas the slot 208 is empty.

In performing the method 100, the processor 202 may operate under the assumption that a network adapter can have at most four physical network ports, for sake of example. Thus, the processor 202 determines that there are eight possible physical network ports, four for each slot 206 and 208. The network adapter card 212 currently inserted into the slot 206 just has two physical network ports 214 and 216, however, and assuming that both ports 214 and 216 are active and currently usable, this means that six physical network ports that the processor 202 determines are not present, and thus not currently usable. Of these six physical network ports, four are assigned to the slot 208, and two to the slot 206.

Also for sake of example, the processor 202 in performing the method 100 may operate under the assumption that each physical network port can have at most four virtual network ports. Therefore, the processor 202 determines that there are thirty-two possible virtual network ports, four for each of the eight possible physical network ports. No virtual network ports may yet have been instantiated for the two physical network ports 214 and 216 that are active and currently usable, such that the processor 202 effectively creates all thirty-two virtual network ports.

In performing the method 100, the processor 202 may operate under the assumption that each physical network port has three physical network addresses, and that each virtual network port has one virtual network address, as may be the case when the network ports 214 and 216 are for a SAN. The three physical network addresses may have already been assigned for each of the physical network ports 214 and 216, and therefore the processor 202 has to assign three new physical network addresses for each of the other six possible physical network ports. Because no virtual network ports have yet been instantiated in this example, the processor 202 also assigns a new virtual network address for each of the thirty-two virtual network ports.

FIG. 3 shows an example method 300 that can be performed once at least parts 102 and 104 of the method 100 have been performed. A new network adapter card may be inserted into an empty slot of a computing device in which no network adapter card was previously inserted when the method 100 was performed (302). In such instance, the method 100 will have determined all possible network ports that can maximally be present on a network adapter card, and will have assigned network addresses to these ports.

Therefore, responsive to insertion of the new network adapter card in part 302, the physical network ports of the new card are correlated with the possible network ports for that slot that were previously determined in the method 100 (304). There are two possible scenarios. First, the number of physical network ports on the new card can be equal to the number of possible physical network ports that was determined for this slot in the method 100. Therefore, the physical network ports of the new card are set to and identified as the previously determined possible physical network ports, and are likewise associated with any virtual network ports that were previously determined for those physical network ports.

Second, the number of physical network ports on the new card can be less than the number of possible physical network ports that was determined for this slot in the method 100. For example, the new card may have just four physical network ports, but sixteen possible physical network ports may have been determined for this slot in the method 100. Therefore, the physical network ports of the new card are to set to and identified as four of the sixteen previously determined possible physical network ports, and are likewise associated with any virtual network ports that were previously determined for those physical network ports.

Once the physical network ports of the new card have been correlated with the previously determined possible network ports, which can include both physical and virtual network ports, network addresses that were previously assigned to these previously determined possible network ports are assigned to the network ports of the new card (306). Parts 304 and 306 therefore permit the management actions that may have been performed in part 106 in relation to possible network ports (via their corresponding addresses) that do not yet exist to then be realized upon the insertion of the new network adapter card. That is, when part 106 was performed, the network ports may not have existed in actuality, even though management actions were undertaken in relation to these ports. Once the new card has been inserted in part 302, the ports of the new card are correlated with the previously determined ports in part 304 and the previously assigned network addresses assigned to the ports of the new card in part 306. As such, the management actions do not have to be performed again; the new card's network ports effectively "take over" or "become" the network ports that were previously determined but that did not yet exist in actuality.

A new network adapter card may be also inserted into an empty slot of the computing device after an existing or old network adapter card has been removed from this slot (308). For example, the method 100 may have been performed in relation to the old network adapter card. Thereafter, the old card may have become faulty, such that it is replaced by the new card. Part 308 encompasses this replacement.

Responsive to the replacement of a new network adapter card in part 308 for an old network adapter card, the physical network ports of the new card are correlated with the previously determined possible network ports of the old card (310). Part 310 is similar to part 304 in this respect. The new card's ports therefore "take over" or "become" the network ports of the old card. If the new network adapter card has a number of physical ports equal to the number of physical ports of the old adapter card, then the ports of the new card are set to and identified as these possible ports.

If the new network adapter card has fewer physical network ports than the old network adapter card, then the physical ports of the new card are set to and identified as some of the ports of the old card. The remaining ports of the old card are specified as being not currently usable. They are still possible network ports for the slot in question, but are just not physically present and thus not currently usable.

If the new network adapter card has more physical network ports than the old network adapter card, then some of the physical ports of the new card are set to and identified as some of the ports of the old card. The remaining ports of the new card are set to and identified as the possible network ports of the old card that were not physically present on the old card. Therefore, these ports are now physically present, and are thus specified as now being currently usable.

Once the physical network ports of the new card have been correlated with the previously determined possible network ports of the old card, which can include both physical and virtual network ports, network addresses that were previously assigned to these previously determined possible network ports are assigned to the network ports of the new card (312). Parts 310 and 312 permit the management actions that may have been performed in part 106 in relation to an existing network adapter card to be retained in the case where the existing card is replaced with a new card. For example, the network ports of an existing card may have been zoned for a number of zones. Conventionally, if this card were replaced with a new network adapter card, the network ports of the new card would also have to be zoned to realize the same configuration as the old card. However, via parts 312 and 314, replacing the old card with a new card precludes the necessity of having to perform rezoning, since in effect the new card's ports "take over" or "become" the ports of the old card.

To assist the administrator or other user in understanding or managing the network ports of the computing device, the method 300 can include displaying a graphical user interface listing all the possible network ports, the network addresses assigned to these ports, the locations of the ports, and the types of the network addresses (314). The location of a port can be specified as the network adapter card in question and the port number (both physical and virtual in the case of a virtual port) of this card corresponding to the port. The network address type depends on the type of network port in question. As noted above, a physical SAN network port can have three types of network addresses: a MAC address, a WWPN address, and a WWNN address. A virtual SAN network port, by comparison, may have just one type of network address. A physical Ethernet network port can have three types of network addresses: a MAC address, an IPv4 address, and an IPv6 address.

In addition, the method 300 can include displaying a graphical user interface listing just the possible network ports that are currently usable, the network addresses assigned to these ports, the locations of the ports, and the types of the network addresses (316). The network addresses and ports displayed in part 316 thus are a subset of the network addresses and ports displayed in part 314. Part 314 provides a user with the maximum network port capability of a computing device, whereas part 316 provides the user with the currently realized network port capability of the computing device.

FIGS. 4 and 5 shows an example graphical user interface 400 that may be displayed according to parts 314 and 316 of the method 300. The graphical user interface 400 includes two tabs 402 and 404. In FIG. 4, the tab 402 has been selected and is visible. In FIG. 5, the tab 404 has been selected and is visible. The tab 402 of FIG. 4 is displayed per part 314 of the method 300, in which all network ports and their network addresses are shown. The tab 404 of FIG. 5 is displayed per part 316 of the method 300, in which just the currently usable network ports and their network addresses are shown.

In the example of FIGS. 4 and 5, a computing device has one slot that can be populated with a network adapter card, and a network adapter card is currently populated in this slot. The network adapter card has just one physical port, but the maximum number of physical ports that any network adapter card can have in this example is set to two. The network adapter card specifically provides SAN network ports in this example. Each physical network port can have four corresponding virtual network ports, identified as functions 1-4.

As such, each physical network port can have three physical network addresses: a (physical) MAC address, a WWPN address, and a WWNN address. Each virtual network address can have one virtual network address: a (virtual) MAC address. Therefore, in FIG. 4, a total of fourteen network addresses are displayed: three physical network addresses for the currently usable physical port of the network adapter card (port 1); four virtual network addresses for the currently usable virtual ports of the network adapter card (functions 1-4 of port 1); three physical network addresses for the physical port that does not exist on the card that is not usable (port 2); and four virtual network addresses for the virtual ports associated with the physical port that does not exist (functions 1-4 of port 2). By comparison, in FIG. 5, just the seven network addresses associated with port 1 are shown, because just these network addresses correspond to currently usable network ports.

It is noted that the physical network port for port 2 and the virtual network ports for this port are determined as possible network ports, and corresponding network addresses assigned thereto, in the method 100 even though the network adapter card does not have a port 2. Therefore, management actions can be performed in relation to port 2 and functions 1-4 of port 2, via their corresponding network addresses, even though such ports are not currently usable. If the network adapter card were replaced in the slot with a new network adapter card that has both port 1 and port 2, then port 2 and functions 1-4 of port 2 would become usable. No further management actions would have to be performed, since they were already performed in relation to port 2 and functions 1-4 of port 2, even though at the time of their performance, port 2 and functions 1-4 of port 2 did not actually exist and thus were not currently usable.

As such, the techniques disclosed herein permit management actions like network configuration to be performed in such a way that future expansion can be provisioned for prior to that expansion occurring. In the example of FIGS. 4 and 5, for instance, port 2 and functions 1-4 of port 2 can have management actions performed in relation to them even though they are not present. When the time of future expansion arrives, no further configuration is required, since configuration was performed earlier.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   determining, by a processor, a plurality of possible network ports of a computing device, regardless of whether the possible network ports are currently usable;
   assigning network addresses, by the processor, to each possible network port;
   performing, by the processor, configuration actions in relation to one or more of the possible network ports regardless of whether the possible network ports are currently usable, the configuration actions configuring how the computing device currently or subsequently communicates over a network via the possible network ports,
   wherein the possible network ports comprise:
      first physical network ports that are physically present, currently activated, and currently usable within the computing device;
      second physical network ports that are physically present, not currently activated, and not currently usable within the computing device;
      third physical network ports that are not physically present and not currently usable within the computing device;
      first virtual network ports that have been instantiated and that are currently usable, each first virtual network port corresponding to one of the first physical network ports; and
      second virtual network ports that have not been instantiated and that are not currently usable, each second virtual network port corresponding to one of the second or third physical network ports,
   wherein the computing device communicates with one or more other computing devices over one or more of the possible network ports to which the network addresses have been assigned, using the network addresses,
   wherein assignment of the network addresses to each possible network port permits the configuration actions to be performed regardless of whether the possible network ports are enabled, activated, or instantiated; and
   when any of the possible network ports that are not currently usable are enabled, activated, or instantiated, configuring the possible network ports according to the configuration actions that have been performed, communication over the network subsequently occurring according to the possible network ports as configured.

2. The method of claim 1, wherein assigning the network addresses to each possible network port that is one of the first or second network ports comprises retrieving an existing physical network address that was previously assigned to the possible network port,
   and wherein assigning the network addresses to each possible network port that is one of the third network ports comprises assigning a new physical network address to the possible network port.

3. The method of claim 1, wherein assigning the network address to each possible network port that is one of the first virtual network ports comprises retrieving an existing virtual network address that was previously assigned to the possible network port,
   and wherein assigning the network address to each possible network port that is one of the second virtual network ports comprises assigning a new virtual network addresses to the possible network port.

4. The method of claim 1, wherein the computing device has a plurality of slots, and the possible network ports that are currently usable are located on network adapter cards inserted into the slots.

5. The method of claim 4, wherein determining the possible network ports of the computing device comprises:
   determining first possible network ports corresponding to network ports associated with the network adapter cards inserted into the slots;
   determining second possible network ports corresponding to network ports associated with any of the slots that are empty.

6. The method of claim 4, further comprising, when a new network adapter card has been inserted into an empty slot in which no network adapter card was previously inserted:
   correlating physical network ports of the new network adapter card with the possible network ports that have been determined; and
   assigning to the physical network ports the network addresses previously assigned to the possible network ports with which the physical network ports are correlated.

7. The method of claim 4, further comprising, when a new network adapter card has been inserted into an empty slot in which an old network adapter card was previously inserted and that has been replaced by the new network adapter card:
   correlating physical network ports of the new network adapter card with the possible network ports of the old network adapter card that have been determined; and
   assigning to the physical network ports the network addresses previously assigned to the possible network ports of the old network adapter card that have been determined.

8. The method of claim 1, wherein the configuration actions comprise zoning the possible network ports over a plurality of separately accessible zones.

9. The method of claim 1, further comprising:
displaying a graphical user interface listing all the possible network ports and the network addresses assigned to the possible network ports.

10. The method of claim 9, wherein the graphical user interface further lists physical locations of the possible network ports and network address types of the network addresses assigned to the possible network ports.

11. The method of claim 1, further comprising:
displaying a graphical user interface listing just the possible network ports that are currently usable and the network addresses assigned to the possible network ports that are currently usable.

12. The method of claim 11, wherein the graphical user interface further lists physical locations of the possible network ports that are currently usable and network address types assigned to the possible network ports that are currently usable.

13. A non-transitory computer-readable data storage medium storing computer-executable code that a processor executes to:
determine a plurality of possible network ports of a computing device, regardless of whether the possible network ports are currently usable;
assign network addresses to each possible network port;
perform configuration actions in relation to one or more of the possible network ports regardless of whether the possible network ports are currently usable, the configuration actions configuring how the computing device currently or subsequently communicates over a network via the possible network ports,
wherein the possible network ports comprise:
first physical network ports that are physically present, currently activated, and currently usable within the computing device;
second physical network ports that are physically present, not currently activated, and not currently usable within the computing device;
third physical network ports that are not physically present and not currently usable within the computing device;
first virtual network ports that have been instantiated and that are currently usable, each first virtual network port corresponding to one of the first physical network ports; and
second virtual network ports that have not been instantiated and that are not currently usable, each second virtual network port corresponding to one of the second or third physical network ports,
wherein the computing device communicates with one or more other computing devices over one or more of the possible network ports to which the network addresses have been assigned, using the network addresses,
wherein assignment of the network addresses to each possible network port permits the configuration actions to be performed regardless of whether the possible network ports are enabled, activated, or instantiated; and
when any of the possible network ports that are not currently usable are enabled, activated, or instantiated, configure the possible network ports according to the configuration actions that have been performed, communication over the network subsequently occurring according to the possible network ports as configured.

14. The non-transitory computer-readable data storage medium of claim 13, wherein the processor is to assign the network addresses to each possible network port that is one of the first or second network ports by retrieving an existing physical network address that was previously assigned to the possible network port,
wherein the processor is to assign the network addresses to each possible network port that is one of the third network ports by assigning a new physical network address to the possible network port,
wherein the processor is to assign the network address to each possible network port that is one of the first virtual network ports by retrieving an existing virtual network address that was previously assigned to the possible network port,
and wherein the processor is to assign the network address to each possible network port that is one of the second virtual network ports by assigning a new virtual network addresses to the possible network port.

15. A computing device comprising:
a processor; and
a non-transitory computer-readable data storage medium storing computer executable code executable by the processor to:
determine a plurality of possible network ports of the computing device, regardless of whether the possible network ports are currently usable;
assign network addresses to each possible network port; and
perform configuration actions in relation to one or more of the possible network ports regardless of whether the possible network ports are currently usable, the configuration actions configuring how the computing device currently or subsequently communicates over a network via the possible network ports,
wherein the possible network ports comprise:
first physical network ports that are physically present, currently activated, and currently usable within the computing device;
second physical network ports that are physically present, not currently activated, and not currently usable within the computing device;
third physical network ports that are not physically present and not currently usable within the computing device;
first virtual network ports that have been instantiated and that are currently usable, each first virtual network port corresponding to one of the first physical network ports;
second virtual network ports that have not been instantiated and that are not currently usable, each second virtual network port corresponding to one of the second or third physical network ports,
wherein the computing device communicates with one or more other computing devices over one or more of the possible network ports to which the network addresses have been assigned, using the network addresses,
wherein assignment of the network addresses to each possible network port permits the configuration actions to be performed regardless of whether the possible network ports are enabled, activated, or instantiated; and
when any of the possible network ports that are not currently usable are enabled, activated, or instantiated, configuring the possible network ports according to the configuration actions that have been performed, communication over the network subsequently occurring according to the possible network ports as configured.

16. The computing device of claim 15, wherein the processor is to assign the network addresses to each possible network port that is one of the first or second network ports by retrieving an existing physical network address that was previously assigned to the possible network port, wherein the processor is to assign the network addresses to each possible network port that is one of the third network ports by assigning a new physical network address to the possible network port, wherein the processor is to assign the network address to each possible network port that is one of the first virtual network ports by retrieving an existing virtual network address that was previously assigned to the possible network port, and wherein the processor is to assign the network address to each possible network port that is one of the second virtual network ports by assigning a new virtual network addresses to the possible network port.

17. The computing device of claim 15, further comprising:

a plurality of slots, wherein the possible network ports that are currently usable are located on network adapter cards inserted into the slots.

18. The computing device of claim 17, wherein when a new network adapter card has been inserted into an empty slot in which no network adapter card was previously inserted, the processor is to:

correlate physical network ports of the new network adapter card with the possible network ports that have been determined; and assign to the physical network ports the network addresses previously assigned to the possible network ports with which the physical network ports are correlated.

\* \* \* \* \*